(12) United States Patent
Hiesch

(10) Patent No.: US 12,258,226 B2
(45) Date of Patent: Mar. 25, 2025

(54) STACKING DEVICE AND STACKING METHOD

(71) Applicant: AUTEFA Solutions Germany GmbH, Friedberg (DE)

(72) Inventor: Robert Hiesch, Augsburg (DE)

(73) Assignee: AUTEFA SOLUTIONS GERMANY GMBH, Friedber (DE)

(*) Notice: Subject to any disclaimer, the term of this patent is extended or adjusted under 35 U.S.C. 154(b) by 0 days.

(21) Appl. No.: 18/186,302

(22) Filed: Mar. 20, 2023

(65) Prior Publication Data

US 2023/0382663 A1    Nov. 30, 2023

(30) Foreign Application Priority Data

May 25, 2022   (DE) .................... 20 2022 102 911.3

(51) Int. Cl.
   *B65G 57/24*    (2006.01)
   *B65G 57/03*    (2006.01)
   *B65G 61/00*    (2006.01)

(52) U.S. Cl.
   CPC ............ *B65G 57/24* (2013.01); *B65G 57/03* (2013.01); *B65G 61/00* (2013.01); *B65G 2201/025* (2013.01); *B65G 2814/0305* (2013.01)

(58) Field of Classification Search
   CPC ........ B65G 57/24; B65G 57/03; B65G 61/00; B65G 2201/025; B65G 2814/0305
   See application file for complete search history.

(56) References Cited

U.S. PATENT DOCUMENTS 9,856,047 B2 *   1/2018   Ford ..................... B65B 69/00

FOREIGN PATENT DOCUMENTS

| DE | 20015199 U1 | 7/2001 | |
|---|---|---|---|
| DE | 202013103400 | * 11/2014 | ............ B65G 59/02 |
| DE | 202013103400 U1 | 11/2014 | |
| DE | 202020103718 U1 | 6/2021 | |
| FR | 2027346 | * 9/1970 | ............ B65G 65/00 |
| FR | 2027346 A1 | 9/1970 | |
| WO | 2015128452 A1 | 9/2015 | |

* cited by examiner

*Primary Examiner* — Lynn E Schwenning
(74) *Attorney, Agent, or Firm* — McGlew and Tuttle, P.C.

(57) ABSTRACT

A stacking device (8), handling plant and method for goods (2) in the form of layers of goods, includes a loading station (10) for feeding and/or removal of layers of goods (3), a stacking station (9) for the arrangement of a stack of containers, which include a mobile stack carrier (7) and inverted containers (4) that are stacked on the stack carrier, are open at the bottom and can be stacked on top of one another. A handling device (11) is arranged between the stacking station and the loading station and handles and moves the inverted container together with a layer of goods between the stacking station and the loading station. The stacking device includes a moveable stack transporter (12) and alternatingly arranges a filled stack of containers (5) with inverted containers with layers of goods and a buffering stack of containers (6) composed of empty inverted containers.

18 Claims, 11 Drawing Sheets

STACKING DEVICE AND STACKING METHOD

CROSS REFERENCE TO RELATED APPLICATIONS

This application claims the benefit of priority under 35 U.S.C. § 119 of German Application 20 2022 102 911.3, filed May 25, 2022, the entire contents of which are incorporated herein by reference.

TECHNICAL FIELD

The present invention pertains to a stacking device and to a stacking method as well as to a storage device and to a handling plant device for goods in the form of layers of goods, wherein the stacking device includes a loading station for the feeding and/or removal of layers of goods, a stacking station for the arrangement of a stack of containers, which comprises at least one mobile stack carrier and box-shaped inverted containers that are stacked on the stack carrier, are open at the bottom and can be stacked on top of one another, and a handling device, arranged between the stacking station and the loading station.

BACKGROUND

Such a stacking device together with a stacking method is known from WO 2015/128452 A1. In this case, a stacking station for an individual stationary stack of containers, a loading station for the feeding and removal of layers of goods and a handling device with a multi-axis mobile handling unit are intended for the handling and moving of the inverted containers open at the bottom and for a respective layer of goods accommodated therein.

SUMMARY

An object of the present invention is to improve the stacking technology with regard to use possibilities as well as to improve the stacking technology qualitatively.

The present invention accomplishes this object with stacking device features according to the invention and with handling plant device features according to the invention and with method (process) features according to the invention.

The stacking technology of the invention, i.e., the stacking device, the stacking method, the storage device and the handling plant have various advantages.

The stacking technology of the invention for goods in the form of layers of goods comprises in one aspect of the present invention a loading station for the feeding and/or removal of layers of goods, a stacking station for the arrangement of a stack of containers and a handling device that is arranged between the stacking station and the loading station. The stack of containers comprises at least one mobile stack carrier and box-shaped inverted containers which are stacked thereon, are open at the bottom and can be stacked on top of one another. The handling device handles the inverted containers open at the bottom in this downwards-open position and moves these together with a respective layer of goods accommodated therein from the stacking station to the loading station and/or from the loading station to the stacking station.

The layer of goods can thereby be carried along by the inverted container being handled and can be moved in a stationary manner onto a support surface, e.g., a supporting bottom of the handling device. The inverted container may likewise lie on the support surface or may float above it at a distance during the moving. The carrying along and the moving of the layer of goods may also be brought about by an additional layer holder. The inverted container may thereby be moved along synchronously.

The stacking technology further comprises a stack transporter, which can be moved in a controlled manner and which arranges a filled stack of containers composed of inverted containers with respective layers of goods accommodated therein and a buffering stack of containers composed of empty inverted containers at the stacking station in an alternating manner. This arrangement may comprise a positioning of the filled stacks of containers and the buffering stacks of containers at the stacking station. The stacking station is a preferably stationary location at the stacking device. The loading station may likewise be a preferably stationary location at the stacking device. The stack transporter may pick up at least one so-called filled stack of containers and at least one so-called empty stack of containers. The stack transporter may have stack receivers suitable for this purpose.

The stack of containers in question may be assembled by the transfer of stacks of containers or be taken down by means of the removal of inverted containers at the stacking station. The inverted containers may in this case either be empty or be filled with a received layer of goods. Layers of goods can be fed and/or removed at the loading station. The layers of goods may also be formed and/or broken up, e.g., into individual rows of goods at the loading station.

At the stacking station, the handling device may push an inverted container filled with a layer of goods and with the opening pointing downwards onto a so-called filled stack of containers or push it off from a filled stack of containers. On the other hand, the handling device may take an empty inverted container from the so-called buffering stack of containers, which is arranged at the stacking station, or transfer and deposit it onto a buffering stack of containers. This removal and release may likewise take place with a displacement motion or even with another motion, e.g., with a lifting over motion, of the handling device.

The arrangement of the stack of containers at the stacking station may change continuously. After each removal or transfer operation of an empty inverted container or of an inverted container filled with a layer of goods, a stack change may be carried out at the stacking station. The preferably two stacks of containers are replaced during the stack change. The times for the stack change and the times for the reciprocating motion of an inverted container between the stacking station and the loading station may be overlapped in a time-saving manner.

It is favorable in this case when the stacking station and the loading station are arranged on opposite sides of the handling device. As a result, the inverted containers can be moved back and forth in a linear displacement motion between the stacking station and the loading station. This is especially favorable for said handling and moving of an inverted container open at the bottom together with a layer of goods accommodated therein from the stacking station to the loading station and/or in the opposite direction. The stacking station and the loading station preferably closely adjoin the handling device, especially the machine frame thereof.

The stacking device and the stacking method being claimed have the advantage of a high efficiency. They allow an especially rapid and gradual assembly and taking down of a filled stack of containers and of a buffering stack of containers at the stacking station and on a mobile stack carrier located there, e.g., on a transport pallet. Such a gradual assembly and taking down of the stack of containers functions faster than the restacking of empty inverted containers and inverted containers filled with a layer of goods at the stacking station and within the stack of containers located there with a stack guide and a stack lifter known from WO 2015/128452 A1.

In the case of the stacking technology known at the priority date, the handling device has to move both the containers with the accommodated layer of containers and has to perform the restacking of the inverted containers.

The stacking technology of the invention offers a high flexibility with a moderate design effort and a high efficiency with the stack transporter which is provided in addition to the handling device and is independently mobile. The motions and functions of the stack transporter during the stack change may be coordinated with the respective inverted container between the stacking station and the loading station in coordination with the bidirectional motions of the handling device.

The stacking technology is preferably also configured to remove empty inverted containers from the buffering stack of containers at the stacking station and/or to transfer empty inverted containers at the stacking station to the buffering stack of containers.

The stacking technology may be configured to load the layers of goods at the loading station into an empty inverted container and to store the layers of goods with this inverted container at the stacking station in a filled stack of containers to be assembled gradually. The stacking technology may also be configured to transfer layers of goods in inverted containers from a filled stack of containers to be gradually assembled at the stacking station and then to unload the respective layer of goods from the inverted container at the loading station. The stacking technology may be configured to carry out either only the storage and loading of layers of goods or only the transfer and the unloading of layers of goods as individual processes or to carry out a combination process with storage together with loading and transferring together with unloading.

During the loading and storage of layers of goods in the filled stack of containers the empty inverted containers used for this purpose can be removed from the respective buffering stack of containers and be brought to the loading station for loading the respective layer of goods. During the storage of the layers of goods together with the inverted containers the filled stack of containers is gradually assembled and the buffering stack of containers with the empty inverted containers can be gradually taken down.

Conversely, during the unloading and transferring of layers of goods, the inverted containers filled with a layer of goods are moved to the loading station and moved back in the empty state to the buffering stack of containers after the unloading of the layer of goods. In this case, the filled stack of containers is gradually assembled and the buffering stack of containers is gradually taken down.

The stacking device may be configured to form filled stacks of containers and/or buffering stacks of containers on a respective stack carrier, which is mobile and is located on the stack transporter. The stacks of containers in question may be assembled and be taken down on the stack carrier at the stacking station. The term stack of containers includes, on the one hand, the stack carrier with one or more inverted containers stacked on it and, on the other hand, also only the stack carrier in a beginning stage or end stage of the assembling or taking down stack formation.

The stacking technology is configured to put the lowermost layer of goods on the mobile stack carrier in the filled stack of containers and the next higher layers of goods on a respective container bottom of a lower inverted container, which container bottom is located at the top. In this case, the layers of goods are each enclosed laterally and on their top side by an upper inverted container arranged above them.

The inverted containers have a stackable configuration. They have said box-like shape with a side wall, with a front-side container bottom and with a large container opening on the other front side. The container opening has a size adapted to the format of a layer of goods and may enclose a layer of goods laterally. The side wall and the container bottom have an at least largely, and preferably entirely, closed wall shape. The inverted containers stacked on top of one another may be secured in their opposite position by means of a catch mechanism.

The inverted container is handled by the handling device in the turned-over position with the container opening pointing downwards. The inverted container may be inverted above the layer of goods in a relative motion from above during the loading of a layer of goods and may accommodate this layer of goods in its inner cavity. Conversely, during the transfer, the inverted container may be lifted up and separated from the accommodated layer of goods. The inverted container and/or the layer of goods may be lifted and lowered for this relative motion.

As an alternative, the loading and unloading of a layer of goods into an inverted container and out of an inverted container may take place in a different manner, wherein the inverted container may be configured corresponding to the circumstances and may be equipped with movable wall parts. The handling device is correspondingly configured for said loading and unloading operations as well as for the storing and transfer of a layer of goods.

The stacking technology may be configured and controlled such that the assembled filled stack of containers is removed by the stack transporter at the end of the storage of the layers of goods and upon reaching a predefined stacking height. Further, a new buffering stack of containers composed of empty inverted containers is fed to the stack transporter. The new buffering stack of containers replaces the old buffering stack of containers taken down beforehand during the storage.

On the other hand, the present stacking technology may be configured and controlled such that the assembled buffering stack of containers is removed by the stack transporter at the end of the transfer of the layers of goods and a new filled stack of containers is fed to the stack transporter. The new filled stack of containers replaces the old filled stack of containers taken down beforehand.

The stacking technology may be further configured and controlled such that the removal of a filled stack of containers and the feed of a buffering stack of containers from and to the stack transporter is chronologically overlapped with a bidirectional motion of the handling device with an inverted container between the stacking station and the loading station. Conversely, the feed of a filled stack of containers and the removal of a buffering stack of containers from and to the stack transporter may also be chronologically overlapped with said bidirectional motion of the handling device. This increases the efficiency of the stacking technology. Interruptions and breaks of the stacking process may be avoided or at least minimized.

For this purpose, the assembled filled stack of containers may be removed by the stack transporter and a new buffering stack of containers may be fed to the stack transporter at the end of the storage of the layers of goods, wherein during this time the handling device handles the last empty inverted container of the taken down buffering stack of containers and loads a layer of goods herein at the loading station as well as moves it to the stacking station and to the mobile stack carrier of the just taken down buffering stack of containers, which stack carrier has been arranged there by the stack transporter in the meantime. The stack carrier of the taken down buffering stack of containers may as a result form the stack carrier of the new filled stack of containers to be assembled.

Conversely, at the end of the transfer of layers of goods, the buffering stack of containers assembled thereby may be removed and a new filled stack of containers may be fed by the stack transporter. During this time, the handling device may unload the layer of goods of the last inverted container of the filled stack of containers at the loading station and then move the empty inverted container to the stacking station as well as to the mobile stack carrier of the taken down filled stack of containers, which stack carrier has been arranged there by the stack transporter in the meantime. This mobile stack carrier of the filled stack of containers just taken down then forms the basis of the new buffering stack of containers to be assembled on it.

In both cases mentioned above during the storage and transfer of layers of goods, the mobile stack carrier of the just taken down stack of containers may be relocated onto the respective other stack carrier from and to the stack transporter. This may take place during the removal and feeding of the stack of containers. The relocation of the mobile stack carrier may happen in combination with the above-mentioned chronological overlapping of the bidirectional motion of the handling device or without such an overlap. The relocation of the mobile stack carrier is favorable for being able to remove a filled or buffering stack of containers on the one side of the stack transporter and to feed a new buffering or filled stack of containers on the other side of the stack transporter. This removal and feeding of the stack of containers from and to the stack transporter may take place in a manner of a circulating motion in a time-saving manner. The stacks of containers may thereby be fed to the stack transporter and be removed from this stack transporter by means of feed conveyors. The feeding and removal operations may take place with a chronological overlap. As an alternative, other operating sequences are possible.

During the storage and transfer of layers of goods, the stack of containers in question may be filled completely with layers of goods or may be completely emptied of layers of goods. A partial filling or a partial emptying is possible, as an alternative. Accordingly, the filled carrier stack may only be partially assembled or taken down and then has a correspondingly low stacking height. A partial filling and partial emptying may depend, e.g., on a filling line connected to the stacking device and on the need or capacity thereof.

It is advantageous to have a predefined and consistent stacking height of the stack of containers for the removal thereof even in case of a partial filling or partial emptying. To this end, so many empty inverted containers may be placed on the partially filled or partially emptied stack of containers after completion of the storage or transfer until an intended stacking height is reached. These empty inverted containers may be removed from the adjacent buffering stack of containers. The buffering stack of containers is thereby taken down entirely or except for a last, still remaining empty inverted container.

A consistent stacking height despite partial filling or partial emptying and a corresponding number of inverted containers in the stack of containers in question are favorable for uniform operating conditions of the stacking technology and of the storage device. In particular, all available inverted containers may always be relocated at the stacking device between the filled and buffered stacks of containers changed at the stacking station. No inverted containers that would have to be removed or fed separately remain.

For the stacking technology being claimed and its functions, a configuration of the stack transporter with at least two stack receivers which are arranged next to one another and can be positioned alternately at the stacking stations is advantageous. The stack receivers are arranged behind one another, e.g., in the direction of motion of the stack transporter. One of the stack receivers is intended for a filled stack of containers and another stack receiver is intended for a buffering stack of receivers. It is favorable for said stack change when the stack transporter and the stack receivers are movable at right angles to a preferably linear direction of movement of the handling device and the handled inverted container.

There are various possibilities for the structural and functional embodiment of the stack transporter. In one advantageous embodiment, the stack transporter has a linear conveyor with said stack receivers. A configuration of the linear conveyor as a slide conveyor is especially advantageous. For this purpose, it has a slide with the at least two stack receivers, a preferably linear slide guide and a slide drive. This is especially advantageous for being able to efficiently move the filled and buffering stacks of containers of different weights and to arrange, especially to position, same at the stacking station.

The stack receivers may have a guiding device, centering device or the like for the exact positioning of the stack carrier and of the stack of containers. The stack carrier may be placed detachably onto the stack receiver as a result. A linear conveyor, especially a slide conveyor, may be controlled in an especially precise manner. The stacking device may have a control unit, to which the handling device and the stack transporter as well as other components of the stacking device, e.g., the feed conveyor and possibly a layer table are connected at the loading station or the like.

The stacking device may have at the stacking station a lifting device that is configured and intended for lifting and lowering a mobile stack carrier from and onto the stack transporter as well as from and onto the stack carrier. The stack transporter may thereby be positioned under the lifted stack carrier. This makes possible said relocation of the mobile stack carrier from a just taken down stack of containers at the stack transporter, especially the relocation from one stack receiver to the other stack receiver.

The stack transporter may be connected to said feed conveyor for a feeding and/or removal of filled and buffering stacks of containers. To this end, the stack transporter may have transfer conveyors, especially cross conveyors, with lifting devices at the connection points of the feed conveyors, which allow a lifting up and releasing of the stacks of containers from the stack transporter.

The feed conveyors may be connected to a transport device of a storage device for stacks of containers. The filled stacks of containers and the buffering stacks of containers may be stocked and temporarily stored in the storage device. The storage device may form, e.g., a temporary buffer memory for empty bottles between a bottle producer, e.g., a blowing machine, an unpacker or the like, and a filling line.

The stacking device may have at least one said mobile stack carrier. This has a carrier top, a carrier bottom and a transport receiver. The carrier top may be configured to receive an inverted container that is open downwards and possibly a layer of goods contained therein. The inverted container may be received in a guided manner and thereby brought into a defined position at the mobile stack carrier and be held in this stack carrier. The guide may be configured, e.g., as a mechanical and positive-locking catch mechanism. Such a catch mechanism may also be configured between the side wall and the container bottom of the respective inverted container.

The carrier bottom of the stack carrier may be configured to form a defined support surface for the stack carrier, especially against a stack receiver at the stack transporter. The carrier bottom may, in addition, be adapted to the top side or the upper container bottom of an inverted container, wherein a respective guide function is configured. The adaptation to a top side or to the container bottom of an inverted container, which is turned over in the stack of containers and points downwards with said container opening, makes possible a stacking on top of one another of a plurality of smaller and individual stacks of containers. In this case, a mobile stack carrier is located between the respective stacks of containers. The assembly and taking down of such multipart stacks of containers may be carried out by means of said transport device. A transport receiver at the stack carrier may make possible a defined meshing with a transport loader, e.g., with a loading fork, with a transport device. A transport receiver may be configured, e.g., as a defined insertion opening with support devices on a side wall of the mobile stack carrier. Other embodiments of the transport receiver, e.g., in the form of projections, coupling devices or the like are possible, as an alternative.

A layer table may be arranged at the loading station of the stacking device in one advantageous embodiment. This layer table may be part of a layer-forming device or of a row-forming device or of a combined layer-forming and row-forming device.

The handling device may likewise have a different structural and functional configuration. The handling device may have a multi-axis movable handling unit for the empty inverted containers or for the inverted containers filled with a layer of goods. The handling unit is thereby configured for handling the inverted containers, which are open at the bottom, in this inverted position.

The handling device may further comprise a supporting bottom, on which the layer of goods that is accommodated in an inverted container may be moved from the stacking station to the loading station and in the opposite direction. Empty inverted containers may be moved on the supporting bottom as well. The supporting bottom bridges over the horizontal distance between the stacking station and the loading station.

The supporting bottom may be moved along with the handling unit. This may be a vertical motion and possibly a lateral motion, with which the supporting bottom closely adjoins the stacking station and/or the loading station. This is advantageous for an unhindered pushing over of a layer of goods and/or of an inverted container from the supporting bottom to the loading station and onto or from a stack carrier or container bottom of an inverted container located there. Said pushing over onto or from a layer table, e.g., arranged at the loading station, is made easier at the loading station.

An adaptation to the stacking heights of the filled stack of containers and of the buffering stack of containers, which stacking heights are changing during the stacking process, is possible due to a vertical adjustment of the handling unit and of the supporting bottom, and especially at a machine frame. The loading station may have a fixed height. The loading station may have, e.g., only one loading table. As an alternative, a plurality of loading tables or other suitable units for the receipt of a layer of goods may be arranged one above the other at the loading station.

The handling device may have one or more, single-axis or multi-axis adjusting devices for the handling unit and/or for the supporting bottom. A counterweight may be provided for a balancing out of vertical motions. This counterweight relieves the one or more drives of the adjusting device and facilitates a precise vertical positioning.

The handling unit may have a handling tool for detachably holding an inverted container, which tool may be moved and guided in a multiaxial manner, e.g., by the adjusting device. The adjusting device may be formed, e.g., by a pivotable or telescopic extension arm with a guide function for the handling tool during the adjustment of an inverted container and by a slide for vertical adjustment during the loading and unloading as well as for the adaptation to the different stacking height. The handling unit may be configured as a multi-axis industrial robot, e.g., an articulated arm robot, in another embodiment. The supporting bottom may have a separate adjusting device.

The handling tool may be configured as a gripping device. The handling tool may comprise, e.g., one or more, preferably adhesive grippers and/or mechanical grippers as well as a positioning device for an inverted container. An adhesive gripper may be configured, e.g., as a suction gripper, a magnetic gripper or the like and may act on the container bottom from the above. A mechanical gripper may have a positive-locking function and locking function. This function may also act in case of failure of an adhesive gripper and may form a protection against loss for a gripped inverted container.

The present invention also pertains to a handling plant for goods, especially empty or filled bottles, wherein the handling plant comprises a stacking device for the goods in the form of layers of goods. The stacking device is configured in the manner being claimed.

The treatment plant may further have a layer-forming device and/or row-forming device connected to a loading station of the stacking device. The layer-forming device forms a layer of goods that is composed of one or more fed rows of goods and provides this layer of goods at said loading station, especially on a layer table. The row-forming device may separate the layer of goods provided at the loading station and form one or more rows of goods, which can then be transported away with corresponding conveying technology.

The handling plant may comprise a goods delivery unit arranged upstream of the stacking device and a goods handling device arranged downstream of the stacking device. A goods delivery unit may be configured, e.g., as an unpacker or as a goods producer, especially a bottle producer. A goods handling device may be configured, e.g., as a filling plant. The goods delivery unit and the goods handling device may be connected to said loading stations.

Additional advantageous embodiments of the present invention are described herein.

The present invention is shown as examples and schematically in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
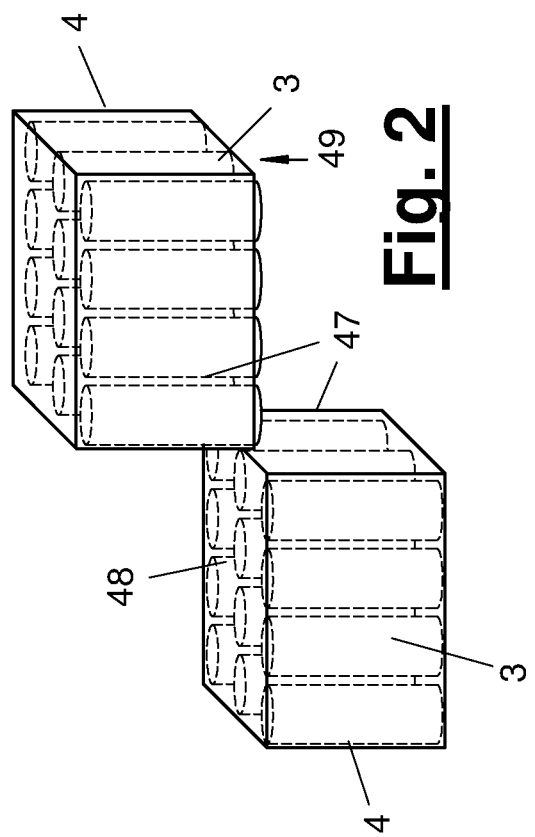
FIG. 1, FIG. 2, FIG. 3 and FIG. 4 are perspective views showing an operating sequence in different partial steps in case of the gripping and stacking of a layer of goods with inverted containers.
Figure 2:
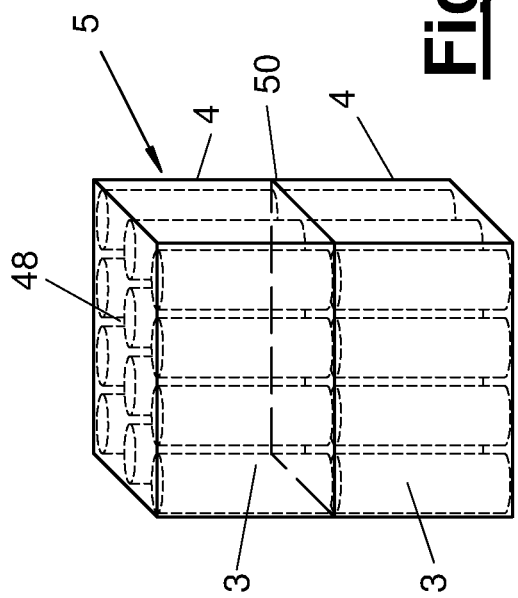

Referring to the drawings, the present invention pertains to a stacking device (8) and to a stacking method for layers of goods (3). It further pertains to a handling plant (1).

Figure 11:
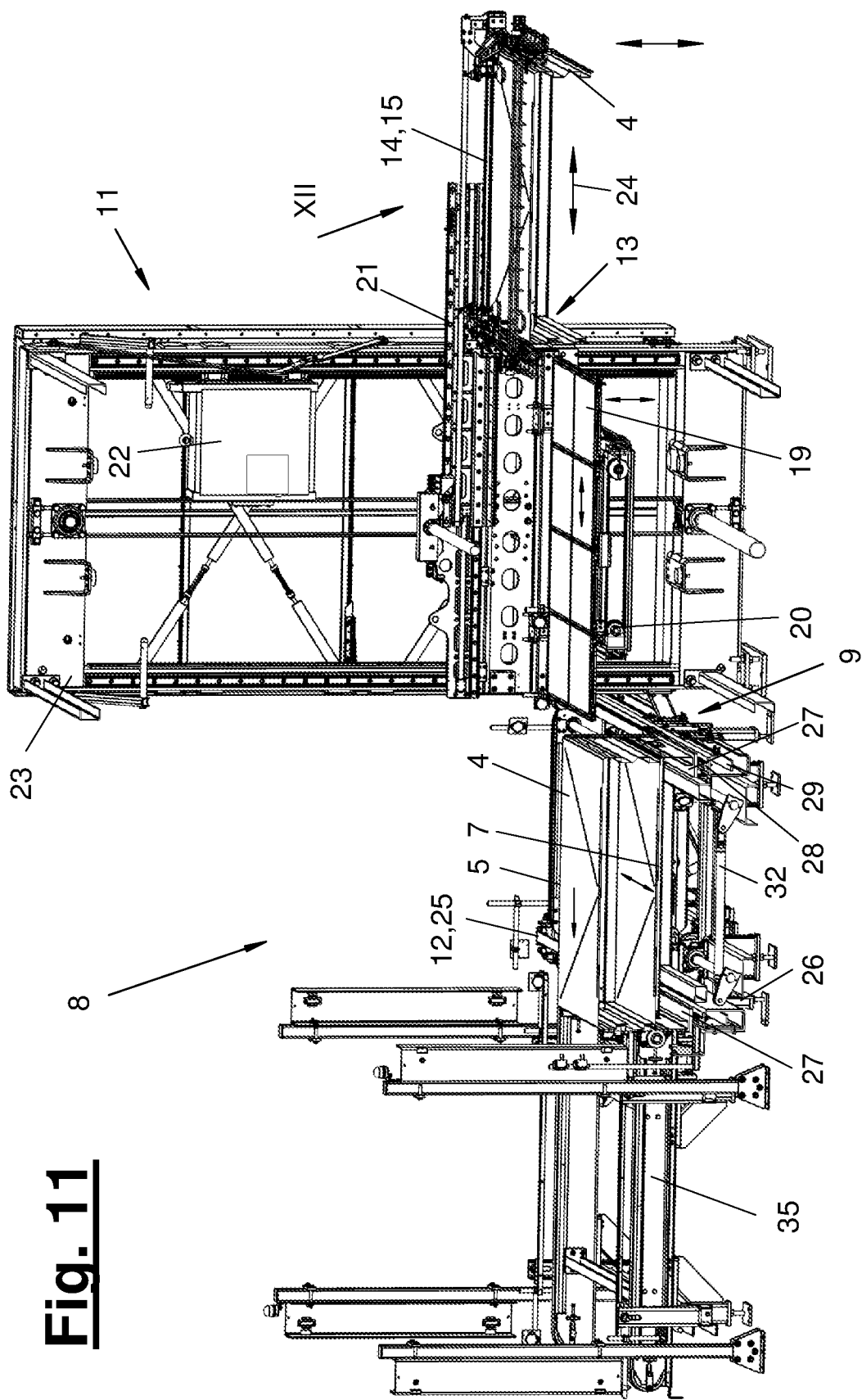
FIG. 11 is a longitudinal sectional view through a stacking device from FIG. 5.
Figure 12:
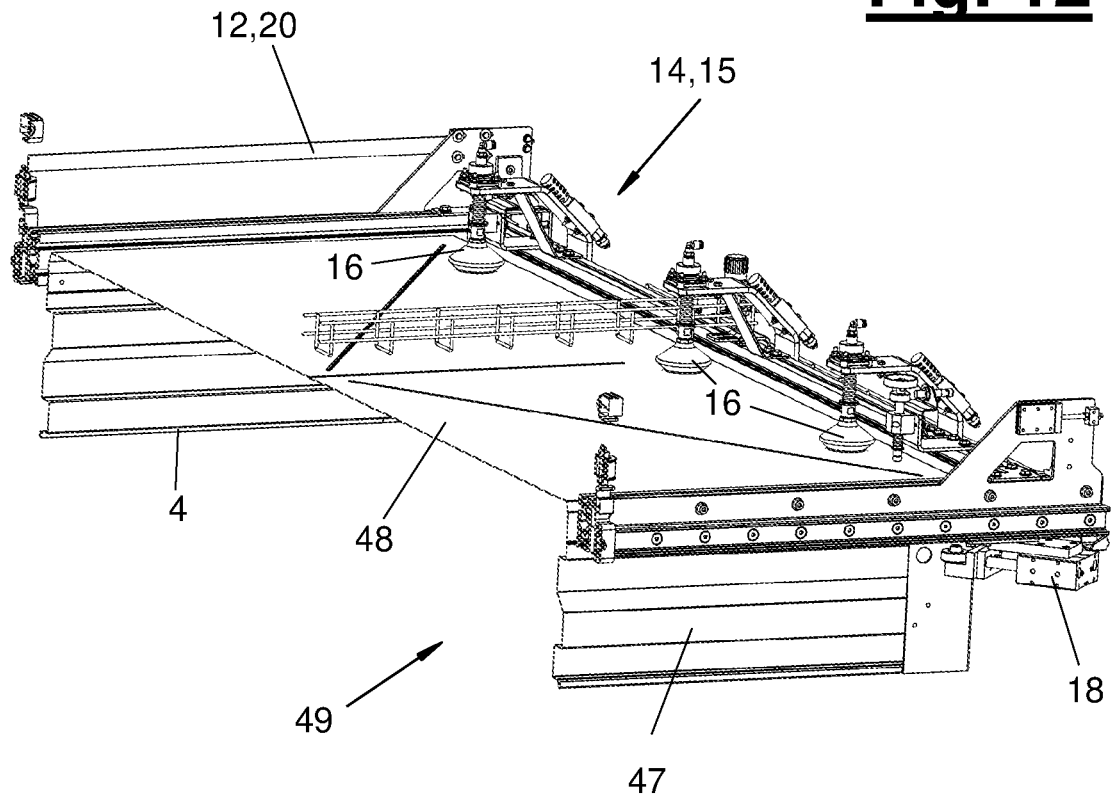
FIG. 12 is a cut-away view showing a handling tool of a stacking device from FIG. 5.
Figure 13:
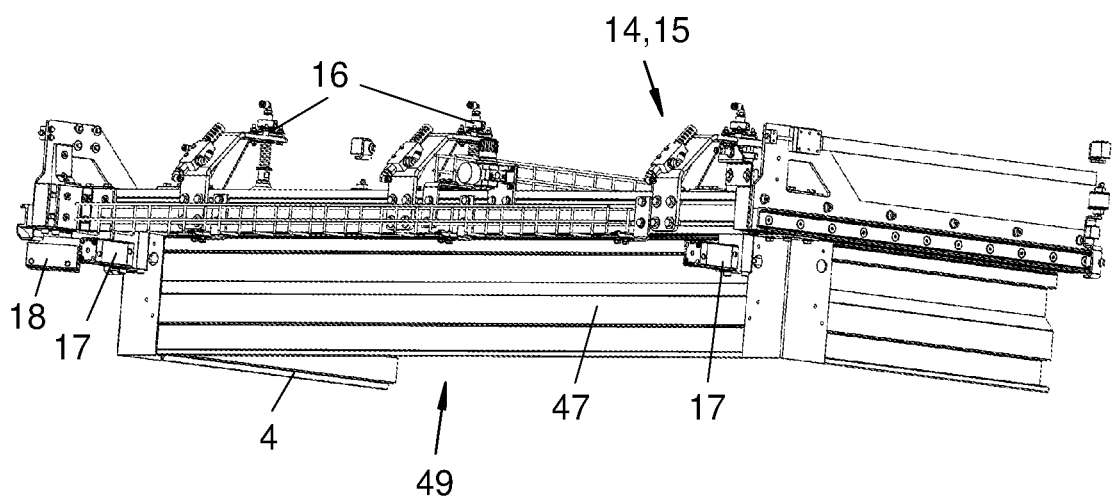
FIG. 13 is a different cut-away view showing the handling tool of a stacking device from FIG. 5.

The layer of goods (3) may be formed by one or more goods (2). The goods (2) may be arranged next to one another and possibly also one on top of another in a face-to-face arrangement or in an arrangement similar to a matrix. The goods (2) consist of empty or filled bottles or other containers in the preferred exemplary embodiments being shown. As an alternative, other forms of goods, e.g., packets or the like are possible. In the exemplary embodiments shown, empty and lightweight bottles made of plastic are used. They may have a rotationally symmetrical or irregular base shape. Such bottles may have an unstable position when they are in the upright position. FIG. 11 illustrates this embodiment.

The goods (2) stand next to one another within the layer of goods (3) in the exemplary embodiments being shown. In this case, they may stand in a regular matrix, which is formed by a plurality of rows of goods which are arranged next to one another and are oriented in the same way. FIG. 11 shows such a layer of goods (3). In another embodiment, an offset of rows and a nesting of the individual goods (2) in adjacent rows are also possible.

FIGS. 1 through 4 illustrate a stacking operation in a plurality of steps. The stacking of layers of goods (3) is carried out by means of inverted containers (4), which have a container side wall (47), a downwardly directed, front-side container opening (49) and an upwardly directed container bottom (48) on the other, opposite front side. The container opening (49) has a large area and has a size adapted to the format of the layers and the contour of a layer of goods (3). The inverted containers (4) may have the shape of turned-over boxes or trays. The inverted containers (4) may be turned over a layer of goods (3) with their lower container opening (49). As a result, they accommodate the layer of goods (3) in their hollow interior, and the layer of goods (3) is supported in another way from the bottom. FIGS. 8 through 11 show this embodiment and arrangement.

The inverted container (4) may have, e.g., a cubic shape and any desired format, e.g., corresponding to a Euro pallet. It may consist of any desired material, especially plastic, metal or wood or even composites. The format of the container interior is preferably adapted to the format of the layer of goods in size and shape and is slightly larger.

The container side wall (47) encloses the layer of goods (3) on its sides in the inverted position. In this case, the container side wall (47) encloses the layer of goods (3) preferably on all sides and as a result offers a lateral guide for the layer of goods (3). In the exemplary embodiments being shown, the, e.g., four side walls of the container wall (47) are connected rigidly to one another and preferably also to the container bottom (48). They form thereby a type of frame for the layer of goods (3). In the exemplary embodiments shown, the walls of the container side wall (47) have a profiled cross-sectional shape and have a massive configuration. They may have interruptions, e.g., a perforation, a grid or the like in another variant. They may also be formed by individual struts arranged at a spaced location, e.g., in conjunction with corner structures. Other suitable wall configurations are possible, in addition. In the exemplary embodiments being shown, the container wall (47) has a rigid configuration and cannot undergo a deformation or can undergo a nonessential deformation at best. In another embodiment, the container wall (47) may have a greater flexibility.

The height of the container side wall (47) is preferably at least equal to or greater than the height of the layer of goods (3). The inverted containers (4) may thereby accommodate a layer of goods (3) completely in their container interior, which is enclosed by the container side wall (47) and by the container bottom (48).

The container bottom (48) has a multiple function. On the one hand, it covers the layer of goods (3) accommodated in the container interior in the upwards direction. On the other hand, the container bottom (48) forms with its outer side a support surface for the next higher layer of goods (3) in the next higher inverted container (4). The top side of the container bottom (48) and the support surface formed hereby may have an essentially flat configuration.

The container bottom (48) preferably has a closed and stable wall. As an alternative, it may have openings, in which case it is configured at least as a grid bottom or perforated bottom. The essentially flat area shape makes possible a movement of the layer of goods (3) and its goods (2) on the outer side of the container bottom (48) and along the support surface.

FIG. 1 shows a first lower layer of goods (3) in an inverted container (4) and a second layer of goods (3), which is arranged and provided above it at a slight distance. According to FIG. 2, the inverted container (4) is placed over this second layer of goods (3), especially turned over from the top. The loose inverted container (4) is held now in a floating position, wherein the lower opening-side edge of its container side wall (47) ends above the underside of the layer of goods (3). In this position, the upper inverted container (4) can, according to FIGS. 2 and 3, then be moved laterally, especially horizontally, whereby the upper inverted container (4) carries along, e.g., the layer of goods (3) and pushes it over the lower inverted container (4) and puts it down on the container (carrier) bottom (48) thereof. During the displacement motion, the upper layer of goods (3) is supported from below with a supporting bottom (19), not shown, on which the layer of goods (3) may slide or slip during a lateral motion. On the other hand, it is possible that an empty inverted container (4) is arranged on the supporting bottom (19) and said layer of goods (3) is supported on the outer side of the container bottom (48) thereof during its displacement motion.

In another embodiment, not shown, the handling device (11) may comprise a layer holder which has a holding function and possibly a moving function for the layer of goods (3). The layer holder may be associated with, e.g., the handling unit (13). The layer holder may be associated with a loading station (10), as an alternative. The layer holder may hold and orient a layer of goods (3) separated from the inverted container (4) in at least some areas. The inverted container (4) may, to this end, be lifted up, e.g., a little from the layer of goods (3), so that the layer holder may have lateral access to the layer of goods (3) and may grip, hold and orient this layer of goods (3). The layer holder may move the layer of goods (3) possibly also by means of a possibly separate drive, and the inverted container (4) held in a floating manner is moved along synchronously.

Figure 3:
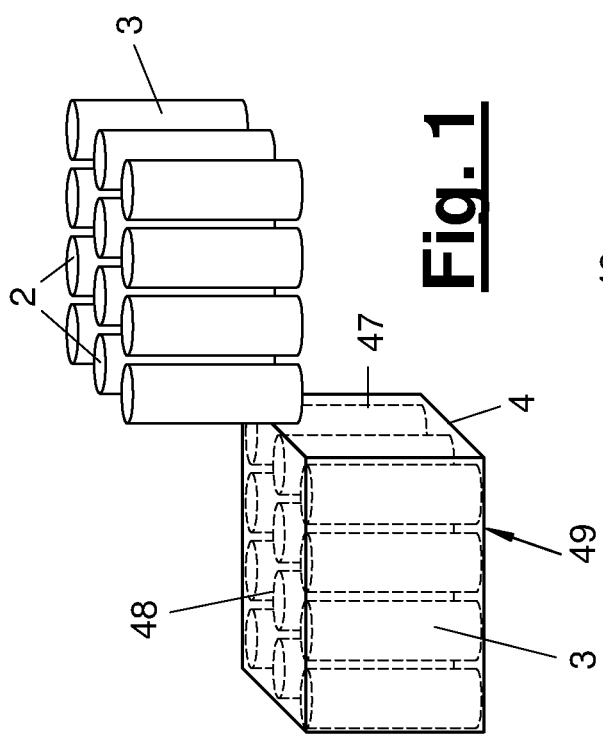
Figure 4:
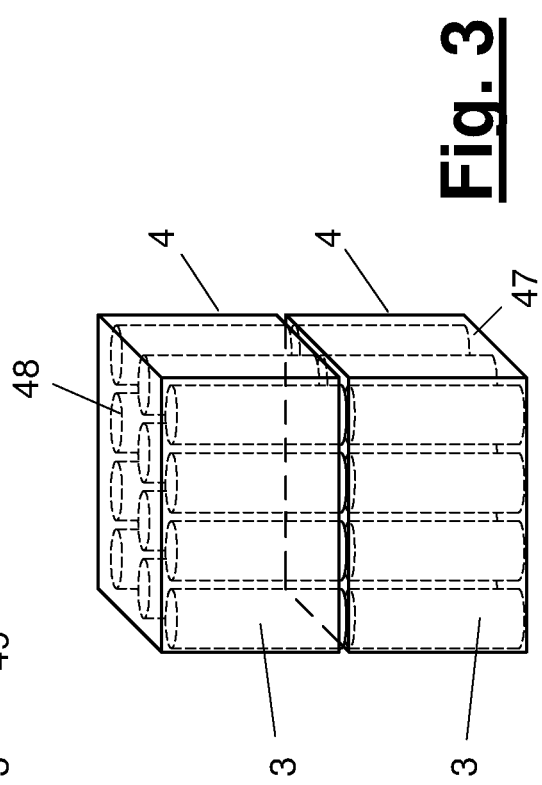

At the end of the lateral pushing operation according to FIG. 3, the upper inverted container still floats at a distance above the lower inverted container (4). In the last step according to FIG. 4, the upper inverted container (4) is lowered and put down on the lower inverted container (4). The container side wall (47) now comes into contact with the container bottom (48) of the lower inverted container (4) and is supported hereon. The interior or the storage space with the accommodated layer of goods (3) is closed in this position circumferentially on all sides.

To secure the mutual positions of the inverted containers (4) stacked one upon the other in the stack of containers (5), a mutual and preferably positive-locking guide of the inverted containers (4) may be present in the contact area. This guide may be configured, e.g., as a mutual positive-locking catch mechanism (50). The catch mechanism (50) may be configured in any desired, suitable manner. In one variant, the container bottom (48) has on its outer side one or more local or possibly circumferential step-like depressions, which receive the opening-side edge of the container side wall (47) of the upper inverted container (4) in a positive-locking manner, center it and secure it laterally against slipping. In another variant, the edges of the container side wall (47) may likewise have a step-like configuration. In addition, any desired, other variants, especially also intermeshing pins or ribs and corresponding receiving openings are possible.

FIGS. 5 through 11 illustrate a stacking device (8), a storage device (37) and a handling plant (1) as well as a stacking method.

Figure 5:
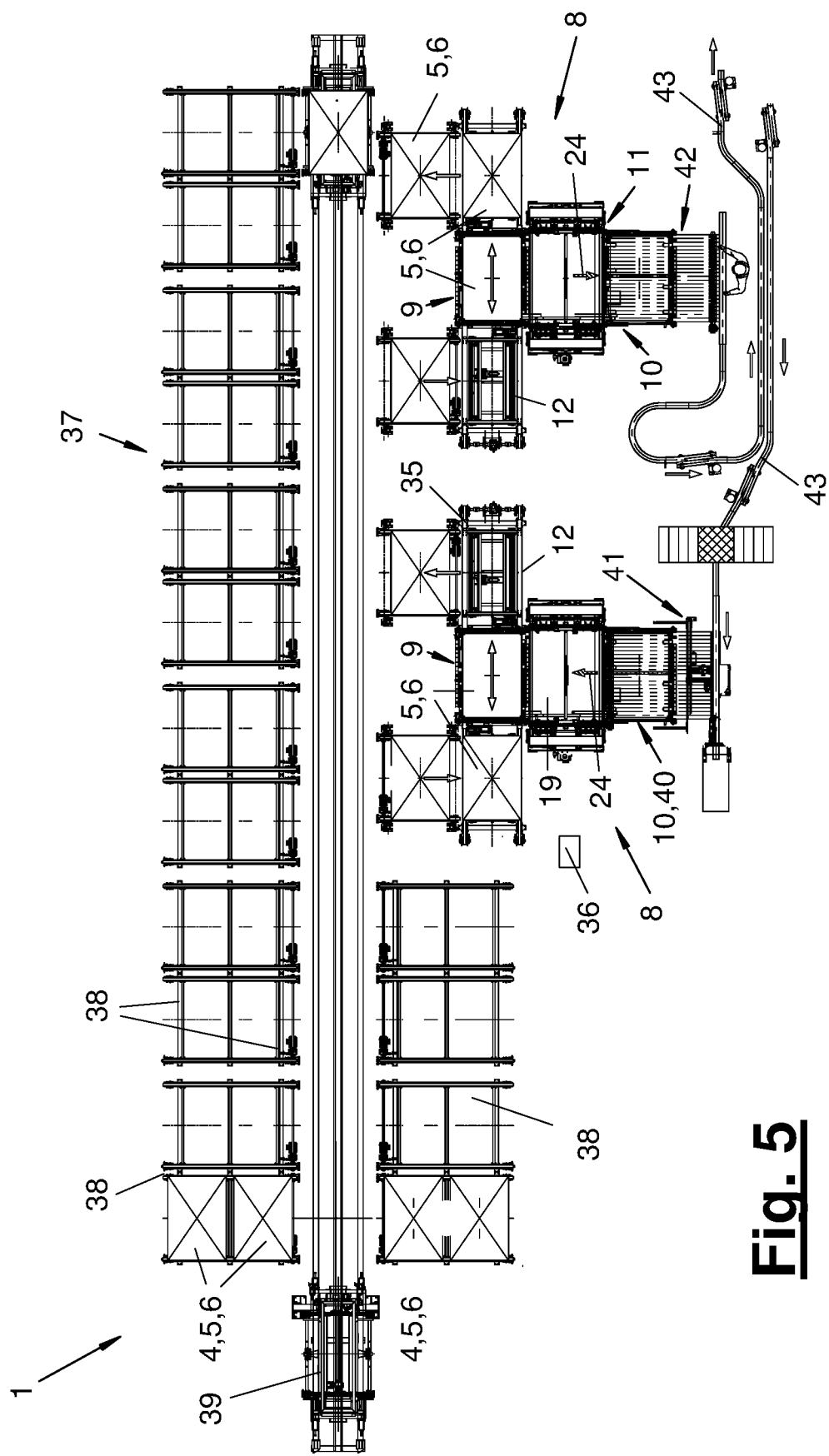
FIG. 5 is a top view showing a handling plant with two stacking devices and with a storage device.
Figure 6:
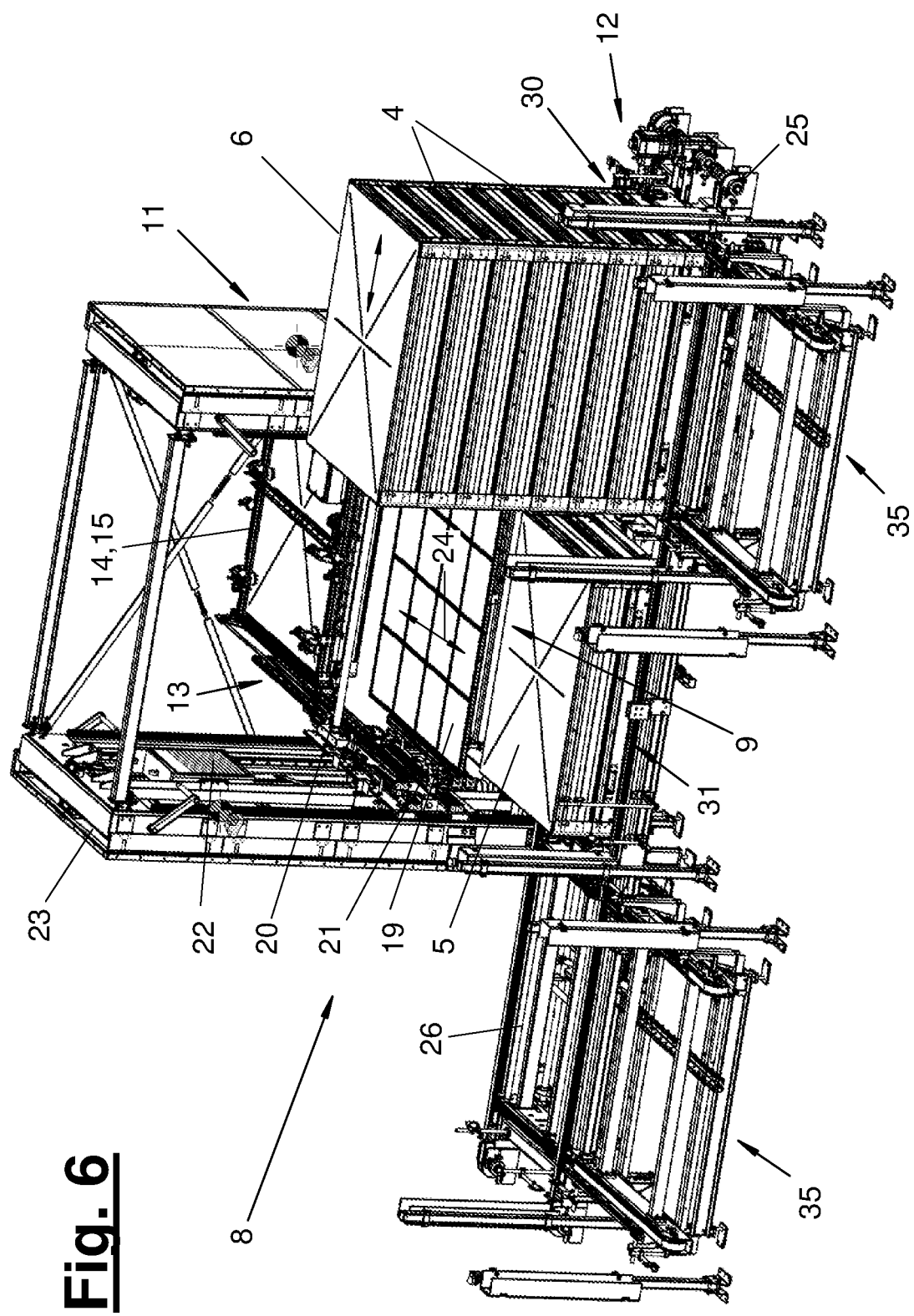
FIG. 6 is a perspective view showing a stacking device from FIG. 5.
Figure 7:
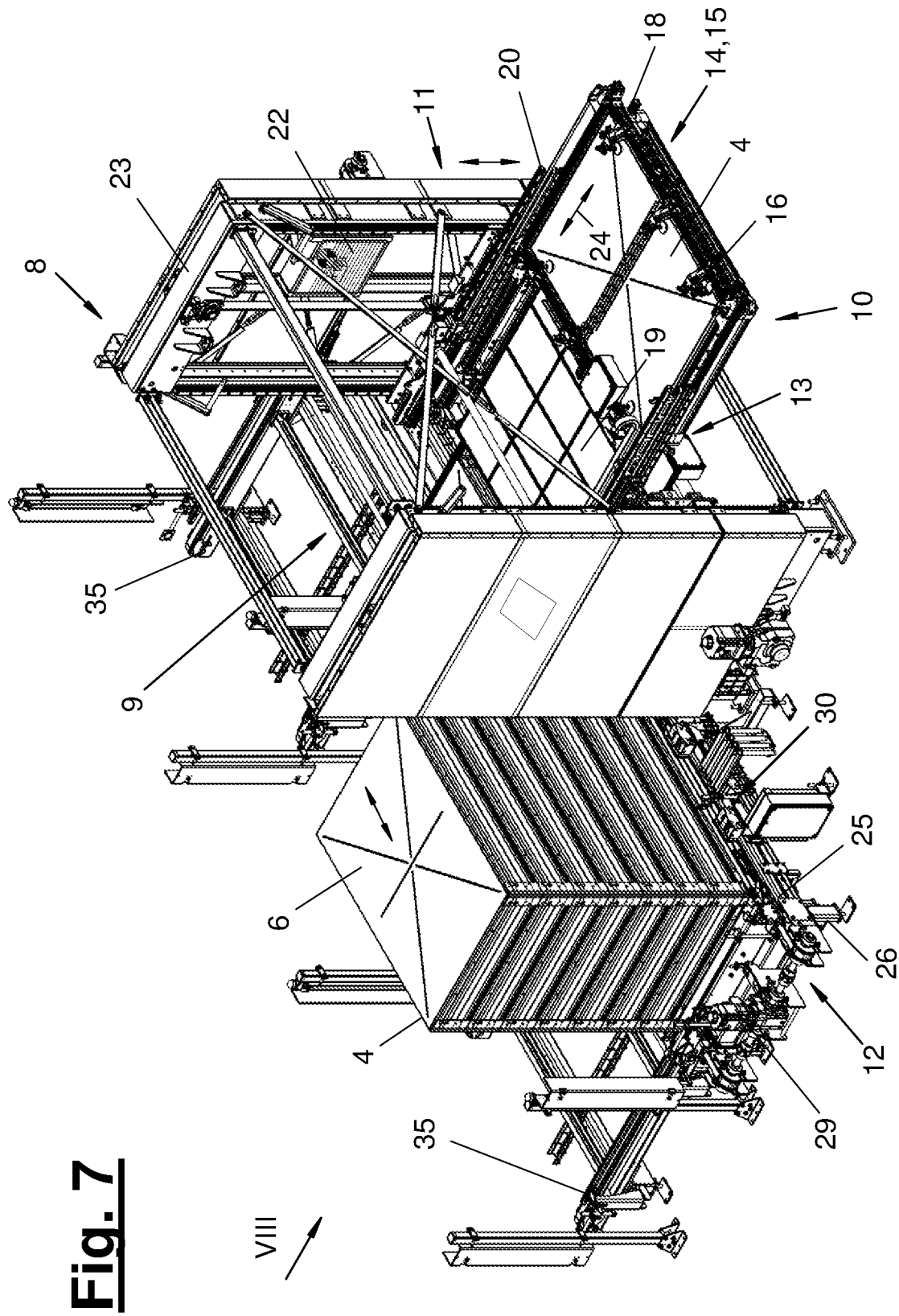
FIG. 7 is a different perspective view showing a stacking device from FIG. 5.
Figure 8:
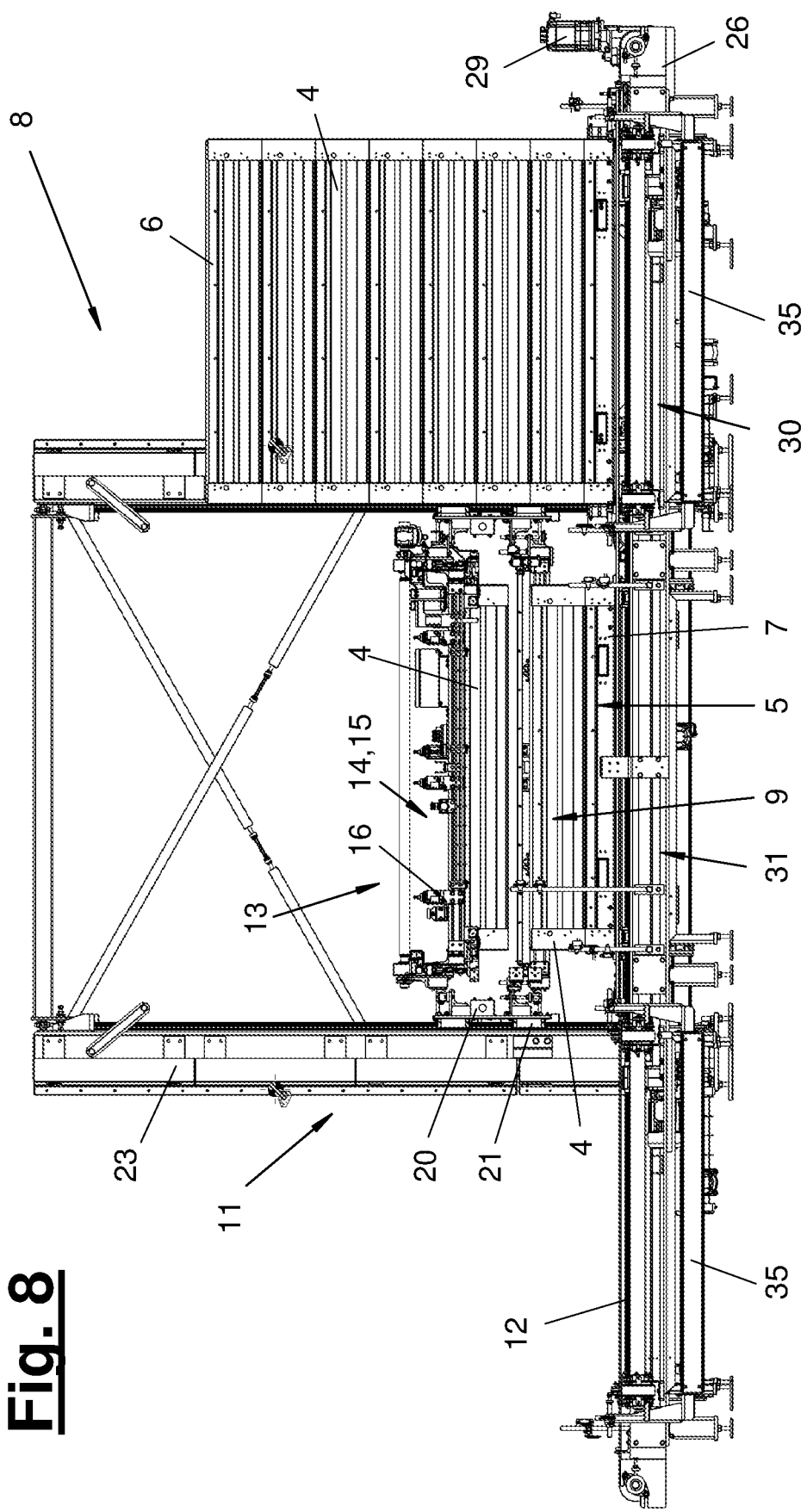
FIG. 8 is a front view of a stacking device from FIG. 5.
Figure 9:
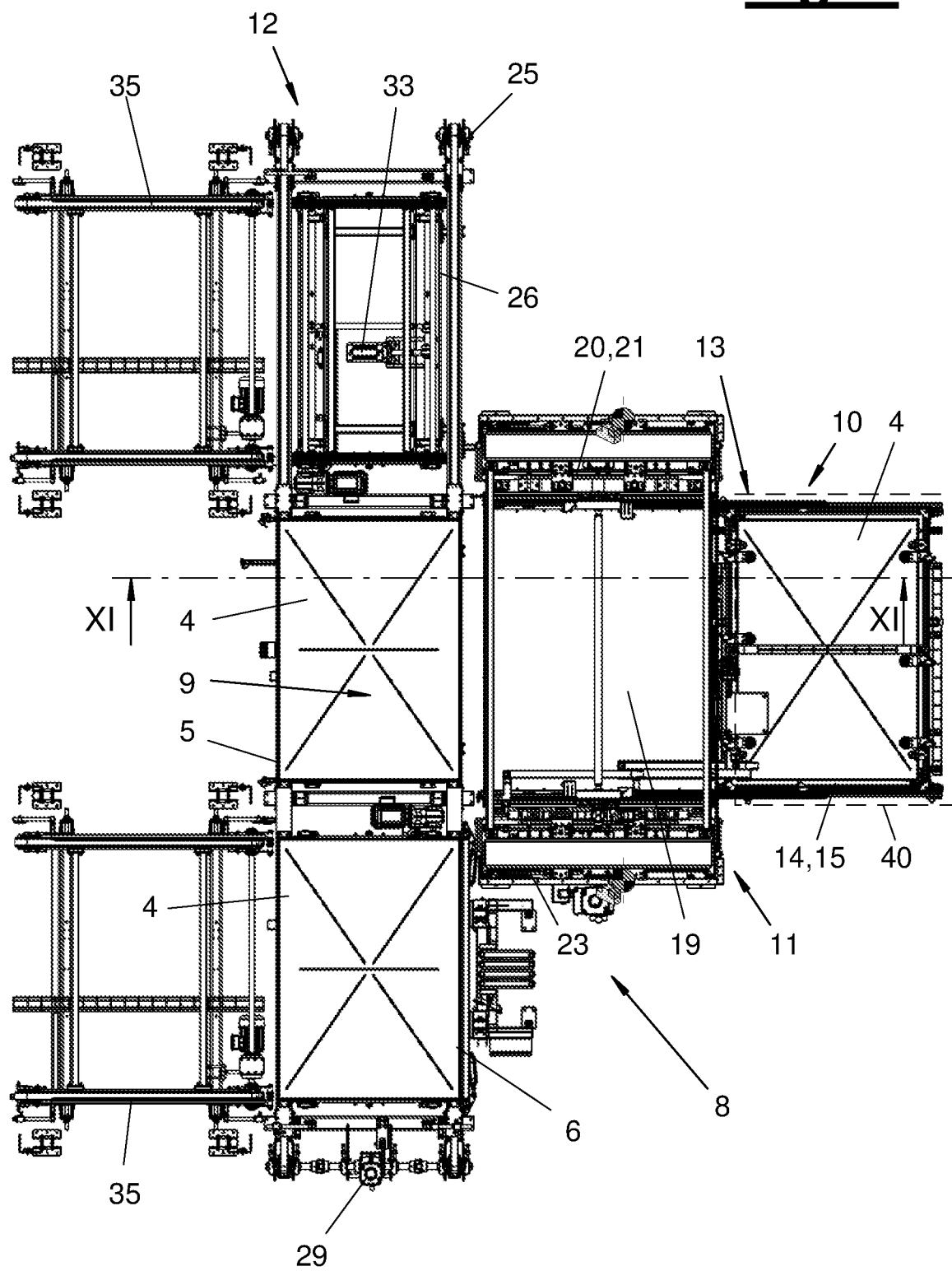
FIG. 9 is a top view of a stacking device from FIG. 5.

FIG. 5 shows in a schematic top view a handling plant (1) for the goods (2), wherein the handling plant (1) comprises two stacking devices (8) and a storage device (37), which is connected to the stacking devices (8) via a transport device (39).

The stacking devices (8) comprise in the embodiments shown each a handling device (11), which is arranged between a stationary loading station (10) for the feeding and/or removal of layers of goods (3) and a stationary stacking station (9) for the arrangement of a stack of containers (5, 6) to be assembled or to be taken down.

The stacking device (8) further comprises a stack transporter (12), which is movable in a controlled manner, which is arranged in the area of the stacking station (9) and which arranges, especially positions, at the stacking station (9) alternately a filled stack of containers (5) composed of inverted containers (4) with respective layers of goods (3) accommodated therein and a buffering stack of containers (6) composed of empty inverted containers (4). The stacking station (9) and the loading station (10) are arranged, e.g., on opposite sides of the handling device (11) and its machine frame (23). As an alternative, a different arrangement, e.g., around corners, is possible.

Figure 14:
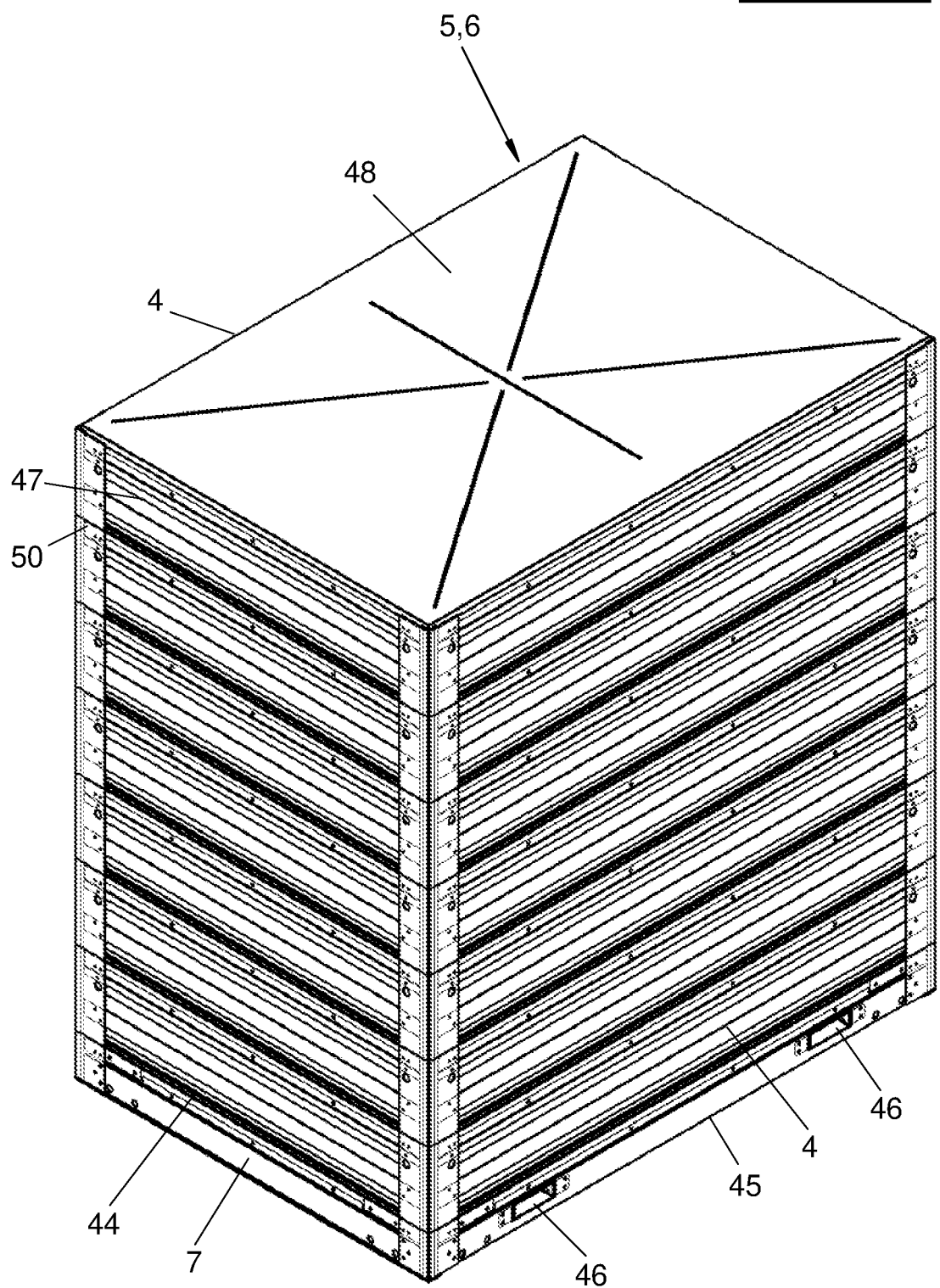
FIG. 14 is a perspective view showing a stack of containers composed of a stack carrier and of a plurality of inverted containers.

The stacks of containers (5, 6) comprise a respective mobile stack carrier (7) and one or more of the above-described inverted containers (4) stacked on it. FIG. 14 shows this embodiment and arrangement.

The stack carrier (7) forms the bottom of the stack of containers (5, 6) to be set up thereon and also forms the support surface for the lowermost layer of goods (3) in the stack of containers (5, 6). The mobile stack carrier (7) has at the top a carrier top (44), possibly a carrier bottom (45) at the bottom and, in addition, a transport receiver (46). The latter is coordinated, e.g., with the transport device (39). The carrier top (44) receives a layer of goods (3) and the lowermost inverted container (4). The inverted container (4), which is open at the bottom, is thereby accommodated in a guided manner, e.g., by a catch mechanism (50).

The carrier bottom (45) may have a multiple function and may have a defined support surface for the stack carrier (7) as well as for the stack of containers (5, 6) set up on it on the ground or on the hall floor and possibly also on the upper inverted container (4) of a lower stack of containers (5, 6). The latter allows the arrangement of layers of a plurality of stacks of containers (5, 6) one on top of the other. In these cases, e.g., a positive-locking guiding function may be present.

The handling device (11) comprises a preferably tower-like machine frame (23), a movable handling unit (13) with a handling tool (14) as well as a likewise movable supporting bottom (9). The handling unit (13) is movable in a multiaxial manner and is configured for handling the inverted containers (4) in the shown inverted position of the inverted container (carrier) (4) with the container opening (49) pointing downwards. The supporting bottom (19) may be moved along with the handling unit (13) synchronously or asynchronously. The handling unit (13) and the supporting bottom (19) are mounted preferably vertically and vertically movable as well as horizontally movable at the machine frame (23). The handling device (11) also comprises one or more adjusting devices (20, 21) for said vertical and/or lateral adjustment of the handling unit (13) and of the supporting bottom (19). A respective separate adjusting device (20, 21) is preferably present for the handling unit (13) and for the supporting bottom (19). The one or more adjusting devices (20, 21) have drives, which are arranged and configured corresponding to the number of axes and are controllable. The net weight of the handling unit (13) and/or of the supporting bottom (19) may be compensated by an adjustable counterweight (22) in the machine frame (23).

The handling unit (13) is configured for detachably holding and handling an inverted container (4). In the exemplary embodiments shown, the handling tool (14) is configured as a gripping device (15) and has one or more grippers (16, 17) as well as a positioning device (18) for an inverted container (4) gripped in the inverted position. In the embodiment shown, adhesive grippers (16) and mechanical grippers (17) are used. The adhesive grippers (16) are configured, e.g., as suction grippers and interact with stops arranged and positioned next to them for the definition of the vertical position of the inverted containers (4) gripped at the container bottom (48). The adhesive grippers (16) act on the top of the container bottom (48). The mechanical grippers (17) are equipped, e.g., with extendable pins, which mesh in a positive-locking manner with corresponding receiving openings at a side wall (47) of the gripped inverted container (4). The positioning device (18) may act on corner areas of the preferably cuboid inverted container (4), which corner areas are located diagonally opposite one another. The positioning devices (18) have, e.g., a positioning piece which is adapted to the corner areas and is provided with a V-shaped opening and is fed to and moved away from the container corner by a controlled positioning drive (18). The grippers (16, 17) and the positioning device (18) may be connected to the control unit (36). In addition, the gripping device (15) has a, e.g., rectangular supporting frame, which is connected to the adjusting device (20) and at which the grippers (16, 17) and the positioning device (18) are arranged. As an alternative, the handling tool (14) may be configured in a different manner.

The adjusting device (20) comprises in the exemplary embodiments being shown a slide, which is guided and driven in a vertically adjustable manner in the machine frame (23) and an extension arm that is guided thereat in a horizontally movable and adjustable manner, at the end of which extension arm the handling tool (14) is mounted. Due to a horizontal displacement motion of the extension arm, the handling tool (14) may be moved over the supporting bottom (19) arranged below up to over the stacking station (9) and over the loading station (10). In this case, a gripped inverted container (4) may be moved correspondingly. A lifting and lowering motion of the handling tool (14) and of the gripped inverted container (4) can be carried out by a vertical motion of the slide. This vertical motion may be used at the loading station (10) for loading the layer of goods (3) in the inverted container (4) and at the stacking station (9) for unloading the layer of goods (3) from the inverted container (4).

The supporting bottom (19) forms a support surface for supporting a layer of goods (3) at its bottom during the moving of the layer of goods (3) in the direction of moving (24). The supporting bottom (19) can be moved horizontally by means of the adjusting device (21) and be brought closer to the stacking station (9) and the loading station (10). Further, a vertical adjustment is possible for adapting the supporting bottom height to the current stacking height at the stacking station (9), on the one hand, and to the, e.g., consistent loading height at the loading station (10). Such an adapting vertical adjustment is also possible for the handling unit (13). The one or more adjusting devices (20, 21), especially their controllable drives, are connected to the control unit (36).

The stack transporter (12) has two stack receivers (30, 31) for a respective filled stack of containers (5) and for a respective buffering stack of containers (6), which stack receivers (30, 31) are arranged next to one another and can be positioned alternately at the stacking station (9). The stack receivers (30, 31) are arranged next to one another at right angles to the direction of moving (24) and are movable at right angles to the direction of moving (24). The stack transporter (12) is configured as a linear conveyor (25) with a linear conveying motion in the exemplary embodiments being shown. As an alternative, the stack transporter (12) may be configured as a rotary conveyor with a rotating conveying motion for adjusting the stack receivers (30, 31). The linear conveyor (25) is configured, e.g., as a slide conveyor. The linear conveyor (25) has a slide (27) with the preferably two stack receivers (30, 31), a preferably floor-mounted slide guide (28) and a slide drive (29). This embodiment of the linear conveyor (25) is shown, e.g., in FIG. 10. The slide (27) has, e.g., one or more longitudinal beams, which are oriented along the adjusting direction and which are possibly connected to one another by crossbeams, forming a frame. The slide (27) is suggested by the dotted line in FIG. 10. The stack receivers (30, 31) are marked by broken lines. The slide guide (28) may have, e.g., a rail with low-friction bearing, e.g., with a recirculating ball guide. E.g., the one or more longitudinal beams of the slide (27) can be guided in a low-friction manner on this rail. The slide drive (29) may be configured, e.g., as a toothed belt drive. The slide drive (29) may comprise one or more toothed belts connected to the slide (27) at the end and a drive motor together with gears.

The linear conveyor (25) is arranged and possibly guided on a frame (26). The frame (26) may carry, e.g., the guide rails of the slide guide (28). The frame (26) has a greater length than the linear conveyor (25) or the slide (27). The travel path of the slide (27) is consequently dimensioned such that the one receiver and the other receiver (30, 31) can alternately be positioned at the stacking station (9). The slide (27) now occupies a respective end position at one end or another end of the frame (26).

Figure 10:
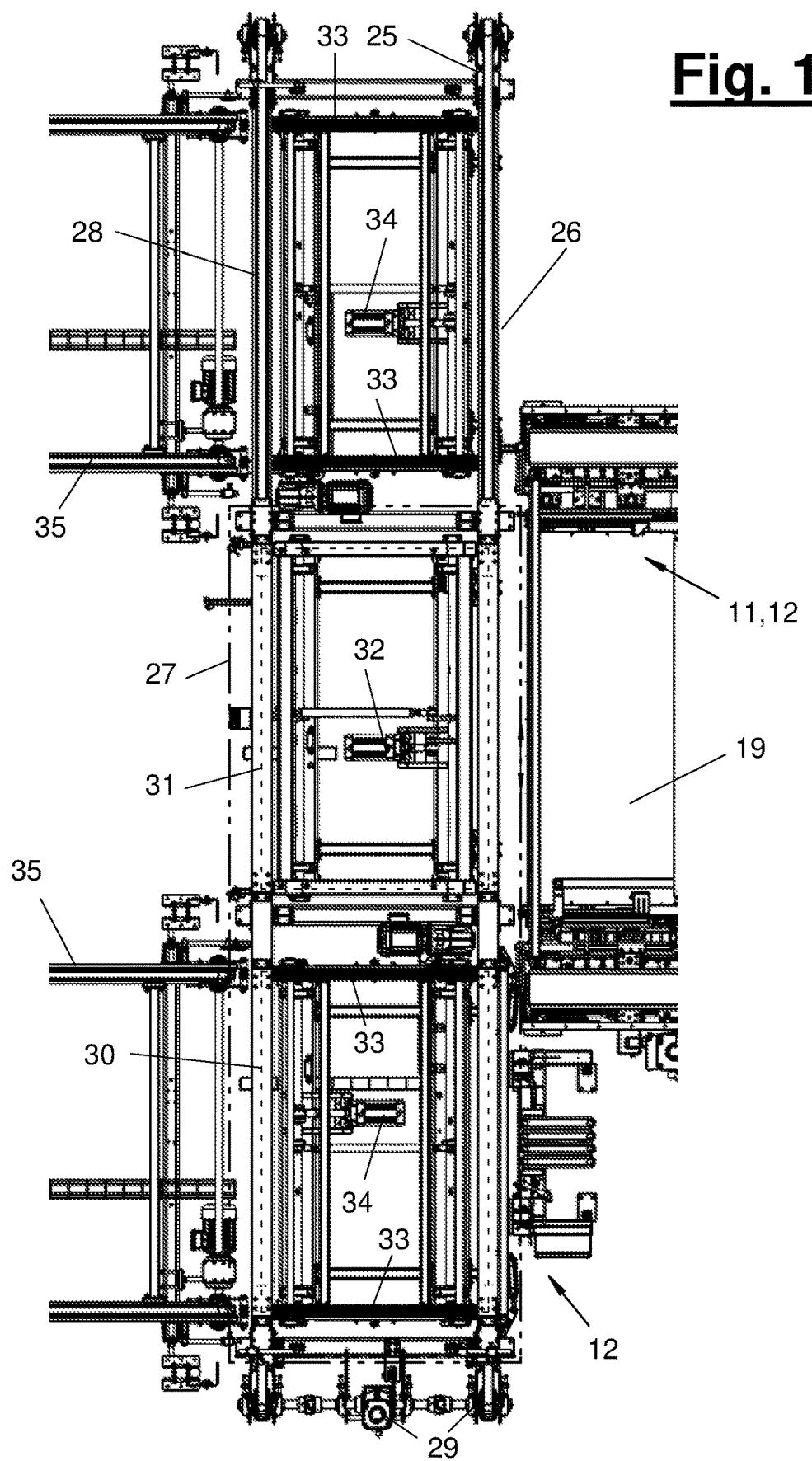
FIG. 10 is a broken-away top view of a stack transporter of a stacking device from FIG. 5.

As FIG. 10 illustrates, the stacking device (8) or the stack transporter (12) has a lifting device (32) at the stacking station (9). This lifting device (32) is intended and configured for lifting and lowering a stack of containers (5, 6), especially of the respective stack carrier (7), from and to a receiver (30, 31) at the stack transporter (12), especially at the slide (27).

The stack transporter (12) is connected to a respective feed conveyor (35) at the ends of the frame (26). The connection is preferably oriented in the transverse direction to the moving direction and adjusting direction of the stack transporter (12). Filled stacks of containers (5) and buffering stacks of containers can be fed and removed via the feed conveyor (35). The stack transporter (12) may have a respective transfer conveyor (33), especially a cross conveyor, with a lifting unit (34) at the connection points of the feed conveyor (35). With the liftable and lowerable transfer conveyor (33), a stack of containers (5, 6), especially the stack carrier (7) thereof, can be raised at the stack receiver (30, 31) and can be released from same. The stack of containers (5, 6) in question may then in this raised position be transported away to the connected feed conveyor (35). This operation takes place in the reverse direction during the feeding of a stack of containers (5, 6) from a feed conveyor (35).

The stack transporter (12) and its above-mentioned components as well as the feed conveyor (35) are likewise connected to the control unit (36).

The feed conveyors (35) are, for their part, connected to a transport device (39), which is, for its part, connected to a storage device (37) for stacks of containers (5, 6). The transport device (39) may be configured in any desired, suitable manner, e.g., as a track-bound conveyor, as a transport device driven in an automated manner or without a drive, e.g., an AGV (automated guided vehicle), as a forklift, of which there is one or more, or the like. The storage device (37) may comprise a plurality of storage spaces (38) for stacks of containers (5, 6). The transport device (39) may transport the stacks of containers (5, 6) from the feed conveyors (35) to the storage spaces (38) and in the opposite direction.

Figure 15:
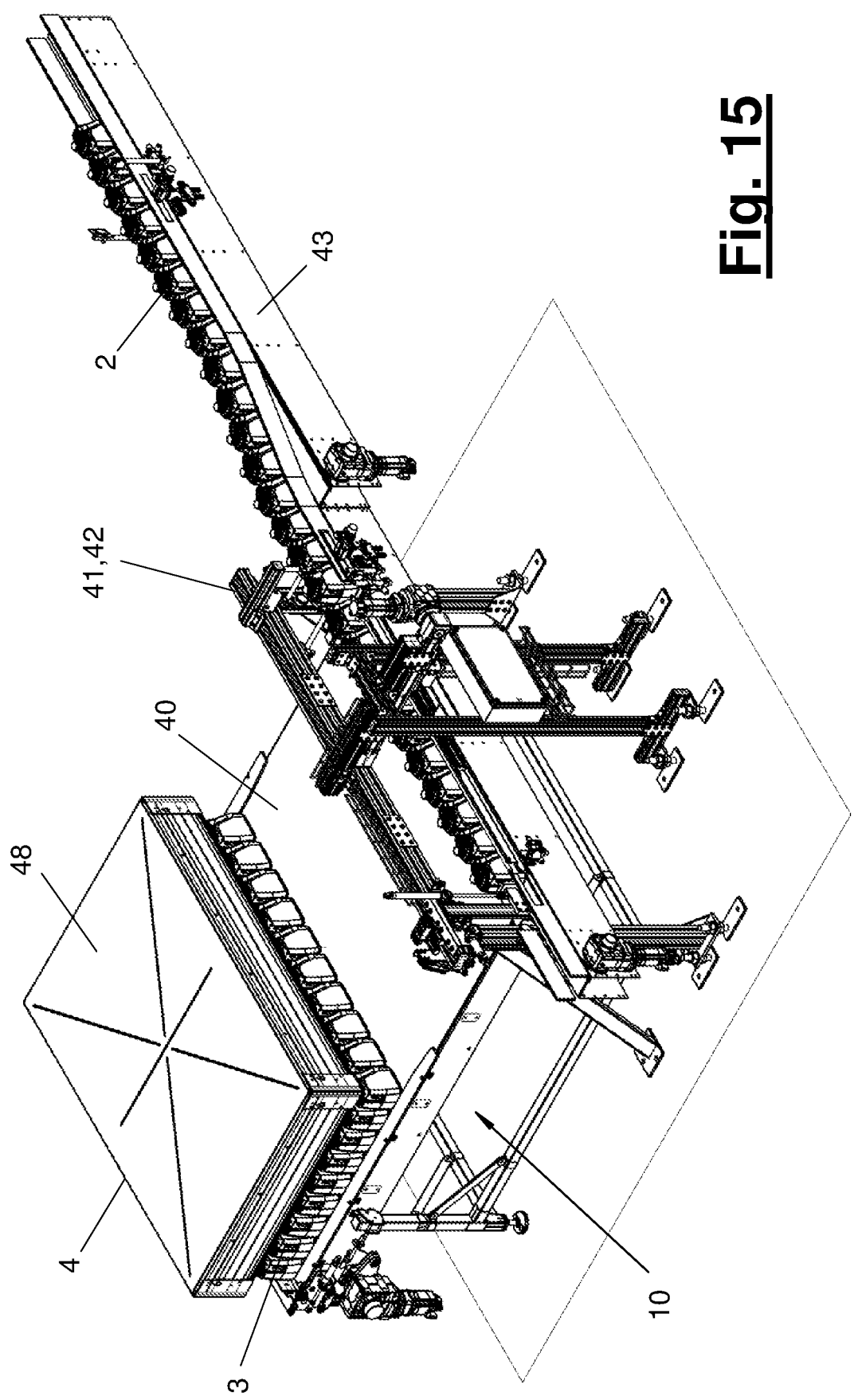
FIG. 15 is a perspective view showing a loading station of the stacking device from FIG. 5 with a layer-forming device and/or row-forming device.

A layer table (40) may be arranged at the loading station (10). This is shown, e.g., in FIG. 15. The layer table (40) may have a rigid or movable configuration, and it comprises, e.g., a belt conveyor in the movable embodiment, which can be moved in a circulating or reversing manner in the moving direction (24) and which receives a layer of goods (3) at its top for said loading and unloading.

The layer table (40) may be connected to a layer-forming device (41) and to a row-forming device (42) or to a combined layer-forming and row-forming device (41, 42). The devices (41, 42) may be connected to a respective goods conveyor (43), which transports the goods (2) in a single row or in multiple rows.

In case of the handling plant (1) shown in FIG. 5, e.g., the stacking device (8) on the left side is intended and configured for the feeding of layers of goods (3) to the loading station (10) and for storing the layers of goods (3) in a filled stack of goods containers (5). In this case, a layer-forming device (41), which forms a layer of goods (3) on the layer table (40) from the goods (2), especially bottles, fed in rows from the conveyor (43), is arranged at the layer table (40). Here, a respective predetermined row of goods (2) is defined at the goods conveyor (43) and is pushed onto the layer table (40) as well as subsequently onto a row of goods already present there.

The stacking device (8) from FIG. 5 on the right side is configured for transferring and removing layers of goods (3) at the loading station (10), wherein a row-forming device (42) is arranged at the layer table (40). This row-forming device (42) breaks up the layer of goods (3) into individual rows of goods and transfer these to the goods conveyor (43).

Functional cycles of the stacking device (8) for storing and transferring layers of goods (3) are described in examples below.

The buffering stack of containers (6) is positioned at the stacking station (9) by the stack transporter (12) for storing a layer of goods (3). The handling device (11), especially its handling unit (13), grips the uppermost empty inverted container (4), raises it possibly for releasing and then moves it in the moving direction to the loading station (10). The layer of goods (3) provided at the loading station (10) is subsequently loaded into the empty inverted container (4), e.g., by a lowering motion of the inverted container (4). The handling device (11) then moves the layer of goods (3) received and the inverted container (4) over the supporting bottom (19) to the stacking station (9). In the meantime, a stack change has taken place at the stacking station (9), wherein the stack transporter (12) has now positioned the filled stack of containers (5) or its stack carrier (7) at the stacking station (9). The handling device (11) then pushes the layer of goods (3) and the inverted container (4) held in an inverted position over onto the stack carrier (7) or the uppermost inverted container in the filled stack of containers (5). The handling device (11) subsequently releases the inverted container (4). After that, an additional stack change may be carried out, wherein the empty stack of containers (6) is again positioned at the stacking station (9).

The above-mentioned cycle is repeated, wherein the filled stack of containers (5) is gradually assembled during the storage and the buffering stack of containers (6) is correspondingly gradually taken down in return by the removal of the inverted containers (4).

When an intended stacking height is reached in case of the filled stack of containers (5), the filled stack of containers (5) is brought to the adjacent feed conveyor (35) and removed from this feed conveyor (35) as well as transferred to the transport device (39).

In this case, a last empty inverted container (4) still remains on the buffering stack of containers (6) taken down. This empty inverted container (4) is positioned at the stacking station (9) with the slide motion during the removal of the filled stack of containers (5) and is taken over and handled by the handling device (11) for loading a layer of goods (3). During this movement of the inverted container (4) from the stacking station (9) to the loading station (10) and back, the stack transporter (12) has transferred the filled stack of containers (5) to the feed conveyor (35).

The stack transporter (12), especially its slide (27), is then moved back in the adjusting and moving direction. Before, the stack carrier (7) of the buffering stack of containers (6), which has been taken down, which stack carrier (7) is located at the stacking station (9), has been raised from the lifting device (32) and has been released from the stack receiver (30). Due to the return motion of the stack transporter (12) or of the slide (27), the stack receiver (30, 31) is also moved past under the raised stack carrier (7) and changed. The stack carrier (7) may then be lowered by the lifting device (32) again and is thereby relocated onto the other stack receiver (31). The stack carrier (7) is then used for assembling a new filled stack of containers (5) and receives the layer of goods (3) fed by the handling device (11) and the corresponding inverted container (4).

Due to said return motion of the stack transporter (12) or of the slide (27), the other stack receiver (30) is positioned at the other feed conveyor (35), which feeds a new buffering stack of containers (6) with empty inverted containers to the transfer conveyor, which then places and positions the stack of containers on the stack receiver (30). The above-described cycle for storing layers of goods (3) can then start anew.

In this mode of operation, the stack carrier (7) and the last empty inverted container (4) of the taken down buffering stack of containers (6) form the stack carrier (7) and the first inverted container (4) in the new filled stack of containers (5) to be assembled. The number of containers in the stacks of containers (5, 6) being fed and removed is thereby always equal.

During the storage of layers of goods (3), the filled stack of containers (5) may be fully assembled or fully filled from filled inverted containers (4).

As an alternative, a partial filling of the stack of containers (5) is possible. The partially filled stack of containers (5) contains in this case only some filled inverted containers (4) with layers of goods (3) and is not yet fully assembled or has not yet reached the intended stacking height. Empty inverted containers (4) are then added to the partially filled stack of containers (5) after completion of the storage by the handling device (11) until it has reached the intended stacking height for the removal. The handling device (11) removes the empty inverted containers (4) from the buffering stack of containers (6) and places them on the partially filled stack of containers (5). The partially filled stack of containers (5) is now gradually assembled in the above-described manner and the buffering stack of containers (6) is correspondingly gradually taken down.

During the transfer of layers of goods (3), the above-described cycle takes place in the reverse order, which is carried out, e.g., in the stacking device (8) from FIG. 5 on the right side.

The handling device (11) removes, e.g., from the filled stack of containers (carriers) (5), which is new and is positioned at the stacking station (9), the uppermost layer of goods (3) and the inverted containers thereof and moves them over the supporting bottom (19) to the loading station (10). Here, the layer of goods (3) is unloaded from the inverted container (4), which is then returned to the stacking station (9). A stack change has taken place in the meantime at the stacking station (9), wherein a buffering stack of containers (6) is provided and takes over the empty inverted container (4) being fed. The handling device (11) waits at the stacking station (9) until a new stack change has been completed and the filled stack of containers (5) is again positioned at the stacking station (9).

When the buffering stack of containers (6) has reached an intended stacking height and the filled stack of containers (5) is taken down except for the last layer of goods (3) and the last inverted container (4), the buffering stack of containers (6) is removed by the stack transporter (12) and transferred to the adjacent feed conveyor (35). During this time, the last layer of goods (3) with the inverted container (4) is moved to the loading station (10) by the handling device (11) and is unloaded there.

In this time period, the stack transporter (12) has completed the removal of the buffering stack of containers (6), on the one hand, and, on the other hand, has carried out an adjusting or displacement motion, during which the stack carrier (7) left behind by the filled stack of containers (5) is raised by the lifting device (32) in the above-described manner and has been relocated onto the stack receiver (30), wherein it is available at the stacking station (9) for the assembly of a new buffering stack of containers (6) and takes over the empty inverted container (carrier) (4) just being fed. In this time period, in addition, a new filled stack of containers (5) has been fed to the stack transporter (12).

The above-described transfer cycle may then be carried out anew. The stack carrier (7) and the last inverted container (4) of the just taken down filled stack of containers (carriers) (5) form the stack carrier (7) and the first empty inverted container (4) of the new buffering stack of containers (5, 6) to be assembled during this cycle. During the transfer, the numbers of containers thus likewise remain equal in the filled and buffering stacks of containers (5, 6).

During the above-described transfer of layers of goods (3), the filled stack of containers (5) can be completely taken down or completely emptied from filled inverted containers (4).

As an alternative, a partial emptying of the stack of containers (5) is possible. The partially emptied stack of containers (5) in this case still contains some filled inverted containers (4) with layers of goods (3) and is not yet completely taken down. Empty inverted containers (4) may then be added to the partially emptied stack of containers (5) after completion of the transfer by the handling device (11) until it has reached the intended stacking height for the removal. The handling device (11) removes the empty inverted containers (4) from the buffering stack of containers (6) and lays them on the partially emptied stack of containers (5). The partially emptied stack of containers (5) is now gradually assembled in the above-described manner and the buffering stack of containers (6) is correspondingly gradually taken down.

The empty inverted containers (4) removed from the buffering stack of containers (6) were deposited and stacked up beforehand on the buffering stack of containers (6) or on the stack carrier (7) during the transfer of the layers of goods (3). The number of containers during the partial transfer and during the subsequent addition of the partially emptied stack of containers (5) is equal.

This is also the case during the above-described storage and addition of the partially filled stack of containers (5). In addition, the last inverted container (4) of the respective stack of containers (5, 6) just taken down during the storage and transfer can be used by the handling device (11) for the assembly of a new stack of containers (6, 5).

The handling device (11) may possibly be modified such that it can handle a plurality of empty inverted containers (4) together, e.g., in a small stack, during the addition of a partially filled or partially emptied stack of containers (5) and can relocate them onto the partially filled stack of containers (5).

The removed, partially filled or partially emptied stack of containers (5), to which empty inverted containers (4) were added, can be stored in the storage device (37). It may be completely filled or completely emptied by the stacking device (8) at a later time. The added empty inverted containers (4) may now first be removed and deposited and stacked on the buffering stack of containers (6) or on the stack carrier (7). They may then be used for storing the layers of goods (3) in the above-described manner. Intermediate stages with an additional partial filling or partial emptying of the stack of containers (5) are also possible.

In the embodiment from FIG. 5, the two stacking devices (8) are used only for storage and transfer. This is, e.g., meaningful when the feeding and the removal of goods (2) take place at the same time on the goods conveyors (43). This may happen, e.g., when the goods conveyors (43) are connected to a filling line, not shown, in the handling plant (1). In this case, layers of goods (3) are transferred from inverted containers (4) by the stacking device (8) on the right side in FIG. 5 and fed to the filling device via the goods conveyor (43). Filled containers (4) then reach the stacking device (8) on the left side and are stored in a filled stack of containers (5) after the formation of layers of goods (3). Layers of goods (3) from empty containers and from filled containers (4) may be stored in the storage device (37).

In another embodiment, not shown, a stacking device (8) may carry out both the storage and the transfer of layers of goods (3). In this case, the layers of goods (3) may, in turn, be composed of identical or different goods (2), especially empty and filled inverted containers (4). The stacking devices (8) are, in addition, capable of handling different goods (2), e.g., different container formats in a different manner to store as well as to transfer them into filled stacks of containers (5).

A variety of variants of the embodiments being shown and described are possible. As a variant of the above-described cycle, it is possible, with the removal of the assembled stack of containers (5, 6), to wait until the other stack of containers (6, 5) is completely taken down. The above-described function of the use of the last inverted container in the just taken down stack of containers may now be dispensed with for the formation of the first inverted container in the new stack of containers to be assembled.

Further, the handling device (11) may be structurally and functionally modified. The handling unit (13) may be configured, e.g., as a multi-axis industrial robot, especially as an articulated arm robot. Further, lifting and lowering motions for the loading and unloading of a layer of goods (3) into and out of an inverted container (4) may be brought about by a lifting and lowering motion at the stacking station (9) and/or at the loading station (10). The inverted container (4) may now remain in its vertical position or may also be correspondingly lifted or lowered. The stack transporter (12) may be configured, instead of as a linear conveyor (25), as a ring conveyor or circular conveyor or an endless conveyor with a straight section in the area of the stacking station (9) or in a different manner.

While specific embodiments of the invention have been shown and described in detail to illustrate the application of the principles of the invention, it will be understood that the invention may be embodied otherwise without departing from such principles.

What is claimed is:

1. A stacking device for goods in a form of layers of goods, the stacking device comprising:
    a loading station configured to feed layers of goods and/or to remove layers of goods;
    a stacking station configured for an arrangement of a stack of containers, which comprises at least one mobile stack carrier and box-shaped inverted containers that are stacked on the stack carrier, are open at a bottom and are configured to be stacked on top of one another;
    a handling device arranged between the stacking station and the loading station, wherein the handling device is configured to handle an inverted container, which is open at the bottom, and to move the inverted container together with a layer of goods accommodated therein from the stacking station to the loading station and/or from the loading station to the stacking station; and
    a stack transporter configured for controlled movement and configured to alternatingly arrange at the stacking station a filled stack of containers comprised of inverted containers with respective layers of goods accommodated therein and a buffering stack of containers comprised of empty inverted containers, wherein:
    the stack transporter comprises at least two stack receivers, which are arranged next to one another and can be positioned in an alternating manner at the stacking station;
    one of at least two stack receivers is intended for a filled stack of containers and another of the at least two stack receivers is intended for a buffering stack of containers; and
    the stack transporter and the stack receivers are moveable at right angles to a movement direction of the handling device.

2. A stacking device in accordance with claim 1, wherein the stacking device is configured to load the layers of goods at the loading station into an empty inverted container, which is removed from the buffering stack of containers, and to store the layers of goods with the inverted container in the filled stack of containers to be assembled gradually at the stacking station, and/or to transfer the layers of goods in inverted containers from a filled stack of containers to be assembled gradually at the stacking station and to unload the respective layer of goods from the inverted container at the loading station as well as to transfer the emptied inverted container to the buffering stack of containers.

3. A stacking device in accordance with claim 1, wherein the stacking device is configured to form respective filled and/or buffering stacks of containers on a stack carrier which is mobile and is located on the stack transporter.

4. A stacking device in accordance with claim 1, wherein the handling device is configured to lift up an inverted container at the loading station from an accommodated and carried-along layer of goods for unloading and/or to lower an empty inverted container at the loading station over a provided layer of goods for loading.

5. A stacking device in accordance with claim 1, wherein the stack transporter comprises a linear conveyor with the at least two stack receivers.

6. A stacking device in accordance with claim 1, further comprising a lifting device configured to lift and lower a stack of containers from and onto the stack transporter, the lifting device being associated with the stacking station.

7. A stacking device in accordance with claim 1, wherein the stack transporter is connected to feed conveyors for the feed and/or removal of filled stacks of containers and buffering stacks of containers.

8. A stacking device in accordance with claim 1, further comprising a layer-forming device and/or a row-forming device comprising a layer table arranged at the loading station.

9. A stacking device in accordance with claim 1, wherein:
    the handling device comprises a multi-axis mobile handling unit for handling the inverted containers with or without the respective layer of goods accommodated therein;
    the handling unit is configured for handling the inverted containers open at the bottom;
    the handling device further comprises a supporting bottom configured to be moved along with the handling unit;
    the handling unit and the supporting bottom are arranged for vertical movement or vertical and laterally movement; and
    the handling device further comprises at least one adjusting device.

10. A stacking device in accordance with claim 9, wherein:
    the handling unit has a handling tool for detachably holding an inverted container; and
    the handling tool is configured as a gripping device comprising one or more grippers and a positioning device for gripping and positioning an inverted container.

11. A handling plant for goods, the handling plant comprising a stacking device for the goods in a form of layers of goods, the stacking device comprising:
    a loading station configured to feed layers of goods and/or to remove layers of goods;
    a stacking station configured for an arrangement of a stack of containers, which comprises at least one mobile stack carrier and box-shaped inverted containers that are stacked on the stack carrier, are open at a bottom and are configured to be stacked on top of one another;
    a handling device arranged between the stacking station and the loading station, wherein the handling device is configured to handle an inverted container, which is open at the bottom, and to move the inverted container together with a layer of goods accommodated therein from the stacking station to the loading station and/or from the loading station to the stacking station;
    a stack transporter configured for controlled movement and configured to alternatingly arrange at the stacking station a filled stack of containers comprised of inverted containers with respective layers of goods accommodated therein and a buffering stack of containers comprised of empty inverted containers; and
    a storage device configured to store stacks of containers comprised of the inverted containers, wherein:
    the stack transporter comprises at least two stack receivers, which are arranged next to one another and can be positioned in an alternating manner at the stacking station;

one of at least two stack receivers is intended for a filled stack of containers and another of the at least two stack receivers is intended for a buffering stack of containers; and the stack transporter and the stack receivers are moveable at right angles to a movement direction of the handling device.

12. A method for stacking goods in the form of layers of goods by means of a stacking device, the method comprising the steps of:

feeding and/or removing layers of goods at a loading station configured to feed layers of goods and/or to remove layers of goods;

arranging a stack of containers at a stacking station, which stack of containers comprises at least one mobile stack carrier and box-shaped inverted containers, stacked on the mobile stack carrier, that are open at a bottom and are configured to be stacked on top of one another;

arranging a handling device between the stacking station and the loading station;

with the handling device, handling an inverted container, which is open at the bottom, and moving the inverted container, together with a layer of goods accommodated therein, from the stacking station to the loading station and/or from the loading station to the stacking station;

providing a stack transporter configured for controlled movement, wherein a filled stack of containers comprised of inverted containers with respective layers of goods accommodated therein and a buffering stack of containers comprised of empty inverted containers are alternatingly arranged at the stacking station with the stack transporter, wherein:

the stack transporter comprises at least two stack receivers, which are arranged next to one another and can be positioned in an alternating manner at the stacking station;

one of at least two stack receivers is intended for a filled stack of containers and another of the at least two stack receivers is intended for a buffering stack of containers; and the stack transporter and the stack receivers are moveable at right angles to a movement direction of the handling device.

13. A method in accordance with claim 12, wherein the handling device removes a respective empty inverted container from the buffering stack of containers at the stacking station during a storage of the layers of goods and during an assembly of a filled stack of containers, feeds the empty inverted container to the loading station, loads the layer of goods provided there into the inverted container, and moves the inverted container with the accommodated layer of goods to the stacking station and moves the inverted container with the accommodated layer of goods onto the filled stack of containers arranged there and subsequently releases the inverted container, wherein the stack transporter subsequently moves the filled stack of containers away and arranges the buffering stack of containers at the stacking station.

14. A method in accordance with claim 13, wherein a removal of a filled stack of containers and the feeding of a buffering stack of containers and/or the feeding of a filled stack of containers and the removal of a buffering stack of containers from or to the stack transporter are chronologically overlapped with an inverted container between the stacking station and the loading station with a bidirectional movement of the handling device.

15. A method in accordance with claim 13, wherein a mobile stack carrier of a just assembled stack of containers is relocated to the stack receivers of the stack transporter during the removal and feeding of the stack of containers.

16. A method in accordance with claim 12, wherein the handling device removes a respective inverted container with an accommodated layer of goods at the stacking station from the filled stack of containers during the transfer of the layers of goods and moves the inverted container to the loading station, unloads the layer of goods at the loading station and subsequently moves the empty inverted container back to the stacking station and releases the empty inverted container onto the buffering stack of containers arranged there, wherein the stack transporter subsequently moves the buffering stack of containers away and arranges the filled stack of containers at the stacking station.

17. A method in accordance with claim 12, wherein:

during the storage and transfer of layers of goods, the stacking device fills the filled stack of containers completely or partially with layers of goods or empties the stack of containers of layers of goods completely or partially; and with a partial filling or partial emptying after the storage or transfer onto the stack of containers, empty inverted containers are relocated from the buffering stack of containers until a predefined stacking height is reached.

18. A method in accordance with claim 17, wherein the filled stack of containers is removed from the stack transporter at an end of the storage and upon reaching a predefined stacking height, and a new buffering stack of containers is subsequently fed to the stack transporter and/or the buffering stack of containers is removed from the stack transporter at an end of transfer and a new filled stack of containers is fed to the stack transporter.

* * * * *